United States Patent Office 2,848,441
Patented Aug. 19, 1958

2,848,441

NEW HYDROXY-CARBOXYLIC ACID AND CONDENSATION THEREOF

Reginald John William Reynolds and Edward Jervis Vickers, Manchester, England, assignors to Imperial Chemical Industries Limited, London, England, a corporation of Great Britain No Drawing. Application August 23, 1955
Serial No. 530,199

Claims priority, application Great Britain August 25, 1954

5 Claims. (Cl. 260—78.3)

This invention relates to a new hydroxy-carboxylic acid useful for the manufacture of polyesters and to its manufacture.

According to the invention there is provided $\alpha:\alpha$-bis-(chloromethyl)-$\beta$-hydroxyproprionic acid.

The $\alpha:\alpha$-bis-(chloromethyl)-$\beta$-hydroxyproprionic acid is a crystalline solid melting at 131–132° C.

The $\alpha:\alpha$-bis-(chloromethyl)-$\beta$-hydroxypropionic acid may be prepared by partial oxidation of pentaerythrityl dichloride with potassium permanganate under acid conditions.

High-melting fiibre-forming or film-forming polyesters may be obtained by self-condensation, by heating, of $\alpha:\alpha$-bis-(chloromethyl)-$\beta$-hydroxyproprionic acid, or of suitable ester-forming derivatives thereof, having the general formula:

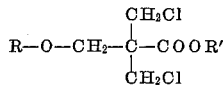

where R may be hydrogen or an acyl group, and R' may be hydrogen, a hydrocarbon residue or an ammonium or substituted ammonium radical. Generally it is preferred that R be hydrogen or a lower aliphatic acyl group and that R' be hydrogen or a lower alkyl group, such that the by-products are readily volatile and can be easily eliminated, under the conditions of condensation.

In carrying out the condensation, $\alpha:\alpha$-bis-(chloromethyl)-$\beta$-hydroxypropionic acid or an ester-forming derivative thereof, is heated, preferably under conditions whereby volatile by-products are removed. Uusually it is preferred that initial condensation be carried out at substantially atmospheric pressure and at temperatures in the region of 100–200° C. The product of this initial condensation is a low molecular weight polymer which may be condensed further to give higher molecular weight polymers by raising the temperature and by reducing the pressure to facilitate the more rapid removal of water or other volatile by-products.

In this further condensation, the temperature may be raised continuously, or in stepwise fashion, so that the reaction-mass is maintained in a molten condition until condensation is completed. Alternatively the final stages of the condensation may take the form of a solid polymerisation. A higher degree of polymerisation may be obtained in this way. The polymerisation is stopped at an appropriate stage, the polymer cooled and the solid polymer so obtained ground to a fine powder. The powdered polymer is then reheated, at as high a temperature as is possible without exceeding the softening point, under reduced pressure, for as long as necessary to obtain a polymer with the desired properties.

A pressure between 0.1 mm. and 20 mm. of mercury is suitable for the final stages of the polymerisation when it is desired to obtain high molecular weight polymers, but lower or higher pressures may be used if desired.

Advantageously the condensation may be carried out in the presence of esterification or ester-interchange catalysts, for example strong acids such as phosphoric acid or p-toluenesulphonic acid, or metal compounds such as the oxides, alkoxides and carbonates or other alkaline-reacting compounds, for example lead oxide, antimony oxide, sodium methoxide and zinc borate. A suitable amount of catalyst for use is from 0.025 to 0.5% of the weight of $\alpha:\alpha$-bis-(chloromethyl) - $\beta$ - hydroxypropionic acid or other ester-forming derivative.

The condensation is preferably carried out in the absence of oxygen and preferably with a stream of oxygen-free gas, for example nitrogen, passing through or over the reaction-mass.

Copolymers may be made by co-condensing $\alpha:\alpha$-bis-(chloromethyl)-$\beta$-hydroxyproprionic acid or ester-forming derivatives thereof with other hydroxy-acids or derived ester-forming derivatives, including cyclic esters formed by self-condensation. Examples of suitable copolymer components are lactic acid, hydroxypivalic acid, diglycollide, methyl p-hydroxybenzoate and $\delta$-valerolactone.

The polyesters, including co-polymers, are particularly useful for the manufacture of moulded articles, fibres and films. A particular feature of polymers containing in major amount the structural unit:

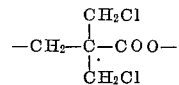

is their high melting point. Hitherto aliphatic polyesters have generally been characterised by comparatively low melting points.

The invention is illustrated but not limited by the following example in which parts and percentages are by weight.

*Example*

A solution of 108 parts of pentaerythrityl dichloride and 230 parts of sulphuric acid in 5000 parts of water is stirred at room temperature and to it is added a solution of 131.5 parts of potassium permanganate in 4000 parts of water, at such a rate that unreacted potassium permanganate does not accumulate in the mixture to any appreciable extent. The time required for this addition is about 12–14 hours. Manganese dioxide is precipitated and a smell of free chlorine develops. When addition of potassium permanganate is complete, the mixture is stirred for a further 3 hours and manganese dioxide is then removed by filtration. Sufficient sodium thiosulphate is added to the filtrate to remove free chlorine, and the clear solution is then extracted with ether. The ether extract, which contains the $\alpha:\alpha$-bis-(chloromethyl)-$\beta$-hydroxyproprionic acid, together with some unchanged starting-material and probably other impurities, is agitated at 0° C. with a slight excess of dilute caustic soda solution, so that the acid passes into the aqueous phase. The aqueous layer is separated and extracted again with ether to complete the removal of ether-soluble impurities. The aqueous solution is finally acidified with hydrochloric acid and extracted with ether, the ethereal extract is dried over anhydrous magnesium sulphate and the ether is removed by distillation to leave $\alpha:\alpha$-bis-(chloromethyl)-$\beta$-hydroxypropionic acid as a crystalline residue which after recrystallisation from benzene melts at 131–132° C. The equivalent weight, determined by titration with standard alkali, is 188 (theory requires 187).

What we claim is:
1. $\alpha:\alpha$-Bis-(chloromethyl)-$\beta$-hydroxypropionic acid.
2. Process which comprises self-condensing, by heating, $\alpha:\alpha$-bis-(chloromethyl)-$\beta$-hydroxypropionic acid.

3. Process which comprises self-condensing α:α-bis-(chloromethyl)-β-hydroxypropionic acid by heating the same at substantially atmospheric pressure and a temperature between 100° and 200° C.

4. The process of claim 2 wherein said α:α-bis-(chloromethyl)-β-hydroxypropionic acid is heated in the presence of a condensation polymerization catalyst.

5. A process for preparing α:α-bis-(chloromethyl)-β-hydroxypropionic acid which comprises partially oxidizing pentaerythrityl dichloride by contacting the same with potassium permanganate in the presence of sulphuric acid.

References Cited in the file of this patent

Beilstein: Handbuch der Organischen Chemie, vol. 1 (1918), pages 483 and 484.